(12) United States Patent
Wu et al.

(10) Patent No.: US 12,297,853 B2
(45) Date of Patent: May 13, 2025

(54) PUSH CONTROLLED POSITIONING DEVICE

(71) Applicant: HANWIT PRECISION INDUSTRIES LTD., New Taipei (TW)

(72) Inventors: Ming-De Wu, New Taipei (TW);
Ching-Kai Chang, New Taipei (TW);
Ying-Chih Tseng, New Taipei (TW)

(73) Assignee: HANWIT PRECISION INDUSTRIES LTD., New Taipei (TW)

(*) Notice: Subject to any disclaimer, the term of this patent is extended or adjusted under 35 U.S.C. 154(b) by 496 days.

(21) Appl. No.: 17/722,813

(22) Filed: Apr. 18, 2022

(65) Prior Publication Data

US 2023/0116676 A1    Apr. 13, 2023

Related U.S. Application Data

(63) Continuation-in-part of application No. 17/510,777, filed on Oct. 26, 2021.

(30) Foreign Application Priority Data

Oct. 8, 2021 (TW) .................................. 110137594

(51) Int. Cl.
  *F16B 2/04* (2006.01)
  *F16B 21/16* (2006.01)
(52) U.S. Cl.
  CPC .............. *F16B 2/04* (2013.01); *F16B 21/165* (2013.01)
(58) Field of Classification Search
  CPC ...... F16B 21/02; F16B 21/165; F16B 5/0208;
  F16B 5/0266; F16B 5/0621; F16B 5/065;
  F16B 2/04; F16B 7/1409; F16B 7/1436;
  F16B 2005/0671; B23Q 3/18; Y10T 403/592
  See application file for complete search history.

(56) References Cited

U.S. PATENT DOCUMENTS

| | | | | |
|---|---|---|---|---|
| 2,399,581 A | * | 4/1946 | Spooner | B60D 1/02 24/453 |
| 3,740,100 A | * | 6/1973 | Perego | F16B 21/16 301/121 |
| 4,541,457 A | * | 9/1985 | Blenkush | F16L 37/42 285/317 |
| 4,875,299 A | * | 10/1989 | Mabboux | A43B 5/0458 24/578.15 |
| 6,033,145 A | * | 3/2000 | Xu | F16D 1/06 74/552 |
| 6,139,214 A | * | 10/2000 | Zirps | A61B 17/162 403/328 |

(Continued)

*Primary Examiner* — Matthew R McMahon
(74) *Attorney, Agent, or Firm* — MUNCY, GEISSLER, OLDS & LOWE, P.C.

(57) ABSTRACT

A push controlled positioning device includes a base with a through shaft hole, a push block horizontally and slidably coupled to the base and holding two limiting balls in two opposite through holes, and an axle seat with a shaft rod inserted into the shaft hole of the base and locked in place by the limiting balls under the effect of the elastic restoring force of an elastic member in the push block. When the push block is pushed laterally, the balls enter respective loosening grooves in the push block to unlock the axle seat, allowing removability of the base and the push block from the axle seat.

8 Claims, 9 Drawing Sheets

(56) References Cited

U.S. PATENT DOCUMENTS

| | | | | |
|---|---|---|---|---|
| 6,644,702 B2* | 11/2003 | Liou | ............ | B25G 3/36 |
| | | | | 403/322.2 |
| 6,955,512 B2* | 10/2005 | Allen | ............ | H05K 7/14 |
| | | | | 211/26 |
| 8,480,329 B2* | 7/2013 | Fluhr | ............ | F41A 11/00 |
| | | | | 403/322.2 |
| 8,533,930 B2* | 9/2013 | Norton | ............ | B23B 31/22 |
| | | | | 279/69 |
| 8,601,667 B2* | 12/2013 | Norton | ............ | B23B 31/1071 |
| | | | | 279/81 |
| 9,255,591 B2* | 2/2016 | Carnevali | ............ | F16B 1/00 |
| 9,265,516 B2* | 2/2016 | Casey | ............ | A61B 17/32 |
| 9,724,830 B2* | 8/2017 | Norton | ............ | B23B 31/22 |
| 11,150,540 B2* | 10/2021 | Zhu | ............ | F16B 7/1409 |
| 11,440,177 B2* | 9/2022 | Sweitzer | ............ | A61B 17/92 |
| 11,644,057 B2* | 5/2023 | Sabo | ............ | B64G 1/2228 |
| | | | | 403/324 |
| 11,679,513 B2* | 6/2023 | Sato | ............ | B25J 15/0425 |
| | | | | 74/490.06 |
| 11,819,094 B2* | 11/2023 | Allevato, III | ............ | B63B 32/45 |

* cited by examiner

PUSH CONTROLLED POSITIONING DEVICE

This application is a Continuation-In-Part of application Ser. No. 17/510,777, filed on Oct. 26, 2021, for which priority is claimed under 35 U.S.C. § 120, the entire contents of which are hereby incorporated by reference.

This application claims the priority benefit of Taiwan patent application number 110137594, filed on Oct. 8, 2021.

BACKGROUND OF THE INVENTION

1. Field of the Invention

The present invention relates to fasteners more particularly, to a push controlled positioning device for fixing or loosening by means of lateral push, which comprises a base, and a push block assembled horizontally on the base, and the displacement of the limiting balls in the two through holes on the base is driven by the push block laterally, so as to achieve the purpose of fixing or loosening the positioning device.

2. Description of the Related Art

Generally, when assembling and joining common plates (board-to-board), they are usually locked with positioning screws with knobs, collars and screws. The assembly procedure is to fix the screws and collars on the outer plate member first, and turn the knobs to lock the screws into the inner plate member, and then use a hand tool to fasten tight the screws, so that the outer plate member and the inner plate member are locked together as a whole. This multi-layer plate member locking mode can be applied to the field of working mother machine or other board-to-board connection plates. However, these work machines need to use plates for locking, most of which are power devices or speed adjustment devices, etc. The various power devices and speed adjustment devices are located inside the space formed by the machine housing, which can be assembled, locked and disassembled by means of plate activity. When the power device crashes, fails, or is damaged, or when the speed adjustment device changes or adjusts the speed, remove the plate members for related maintenance and adjustment operations. The plate members are locked by a plurality of positioning screws, so it is easy to cause the positioning screws to fall off and lose during the disassembly process, and it is impossible to re-lock the plate members back to the original position, which will cause inconvenience and trouble in assembly and disassembly. In order to solve the shortcomings that the locking screws are easy to lose, some companies have developed a fixing device composed of a cap, a screw rod and a positioning block. First buckle the positioning block of the fixing device into the perforation of the plate member, and then use the screw rod to lock it to another plate member to form a fix. When the user disassembles the plate member, the fixing device can still be fixed in the perforation of the plate member through the positioning block, so that the fixing device will not fall off or lose. However, in the assembly process, the user must use force or hand tools (such as: screwdriver or wrench, etc.) to control the locking or disassembly of the fixing device. There are still many defects and problems in practical applications.

However, when applied to the combination of two opposing plates by locking and fixing, under the requirements of mass production and processing efficiency that pay attention to modularization, the tedious manual assembly process using screws will seriously affect the progress of the manufacturer's shipment, and the screws are easy to be lost in the process of locking the two plates due to their small size, and it will be difficult to assemble, align or lock due to the difference in the size of the screw holes at the screw locking position or the inconsistency of the number of screw holes and the pitch of the screw holes. Moreover, the space for operating the screws between the two opposing plates is quite narrow, that is, when the screws are assembled and disassembled, it is easy to be obstructed by surrounding objects, which is not only time-consuming and inconvenient, but also leads to an increase in the overall cost. This increases the burden on the industry.

Therefore, how to solve the problem and inconvenience that the fixing device used in the current plate locking is easy to be loosened and disengaged by wrong rotation, and the trouble and inconvenience of applying force or using hand tools when assembling the fixing device is the direction that the relevant manufacturers in this industry are eager to study and improve.

SUMMARY OF THE INVENTION

The present invention has been accomplished under the circumstances in view. It is therefore a main object of the present invention to provide a push controlled positioning device, which comprises a base and a push block. The base comprises a through shaft hole inside, two through holes opposingly arranged on an inner wall surface of the shaft hole and penetrating toward the outside in the direction perpendicular to the shaft hole, a limiting ball respectively installed inside each through hole, and two opposing limiting portions respectively provided on the periphery thereof near the through holes. The push block is movably mounted on the base in a perpendicular manner relative to each other. The push block comprises a sliding space placed on the base for horizontal sliding displacement, two loosening grooves respectively provided on two opposite side wall surfaces of the sliding space and movable with the push block into alignment with the two through holes, an accommodating groove provided on one side wall surface of the sliding space in the vertical direction of the two loosening grooves, an elastic member accommodated in the accommodating groove and stopped against the outer surface of the base, and a cover covered on a top side thereof to shield the outside of the sliding space. The cover is provided with a positioning shaft hole for the base to pass through. It achieves the purpose of pushing the push block horizontally at the base level to fix or loosen it, and through the position of the push block, it is easy to identify whether the positioning device is positioned or not, so as to achieve the effect of convenient application.

Preferably, the base further comprises a bottom block with a larger outer diameter on one side near said two through holes. The limiting portions are planar limiting portions respectively located on the bottom block at two opposite sides. The push block further comprises a guide chute concavely provided at a bottom of the sliding space and nested at the two limiting portions. The base further comprises a mounting groove located on a bottom side of the bottom block opposite to the two through holes for the positioning of a first positioning hole of a preset first plate.

Preferably, the push block and the sliding space are rectangular, and the push block further comprises an actuation portion bilaterally located on one side thereof near the accommodating groove. The cover covered on the push block is in the shape of a rectangle, and the positioning shaft hole of the cover is used for the base to be combined and fixed after being worn, so that the push block is allowed to be pushed to slide horizontally and laterally relative to the base under the cover.

It is therefore a main object of the present invention to provide a push controlled positioning device, which comprises a base, a push block, and an axle seat. The base comprises a through shaft hole inside, two through holes opposingly arranged on an inner wall surface of the shaft hole and penetrating toward the outside in the direction perpendicular to the shaft hole, a limiting ball respectively installed inside each through hole, and two opposing limiting portions respectively provided on the periphery thereof near the through holes. The push block is movably mounted on the base in a perpendicular manner relative to each other. The push block comprises a sliding space placed on the base for horizontal sliding displacement, two loosening grooves respectively provided on two opposite side wall surfaces of the sliding space and movable with the push block into alignment with the two through holes, an accommodating groove provided on one side wall surface of the sliding space in the vertical direction of the two loosening grooves, an elastic member accommodated in the accommodating groove and stopped against the outer surface of the base, and a cover covered on a top side thereof to shield the outside of the sliding space. The cover is provided with a positioning shaft hole for the base to pass through. The axle seat comprises a seat body located outside the base, a shaft rod extending outward from one side of the seat body and penetrating into the shaft hole of the base, a stop block provided on the suspended side of the shaft rod, and a concave ring groove provided at the shaft rod between the stop block and the seat body in alignment with the two through holes so that the limiting ball in each the through hole is able to be locked or withdrawn from the concave ring groove. It achieves the purpose of pushing the push block horizontally at the base to fix or loosen it with the axle seat, and through the pushing position of the push block, it is easy to identify whether the positioning device is positioned or not, so as to achieve the effect of convenient application.

Preferably, the outer diameter of said shaft rod is smaller than the diameter of the shaft hole. The axle seat further comprises a connecting side provided on the other side of the seat body relative to the shaft rod for a second positioning hole of a preset second plate to be inserted and fixed. The stop block of the axle seat comprises a first guide inclined surface that is tapered and inclined to extend to the concave ring groove, and a second guide inclined surface that is tapered and inclined to extend opposite to the first guide inclined surface.

Other advantages and features of the present invention will be fully understood by reference to the following specification in conjunction with the accompanying drawings, in which like reference signs denote like components of structure.

DETAILED DESCRIPTION OF THE PREFERRED EMBODIMENT

In order to achieve the above objects and effect, the technical means used in the present invention and its structure, implementation method, etc., the preferred embodiment of the present invention is hereby described in detail and its features and functions are as follows, so as to be fully understood.

Figure 1:
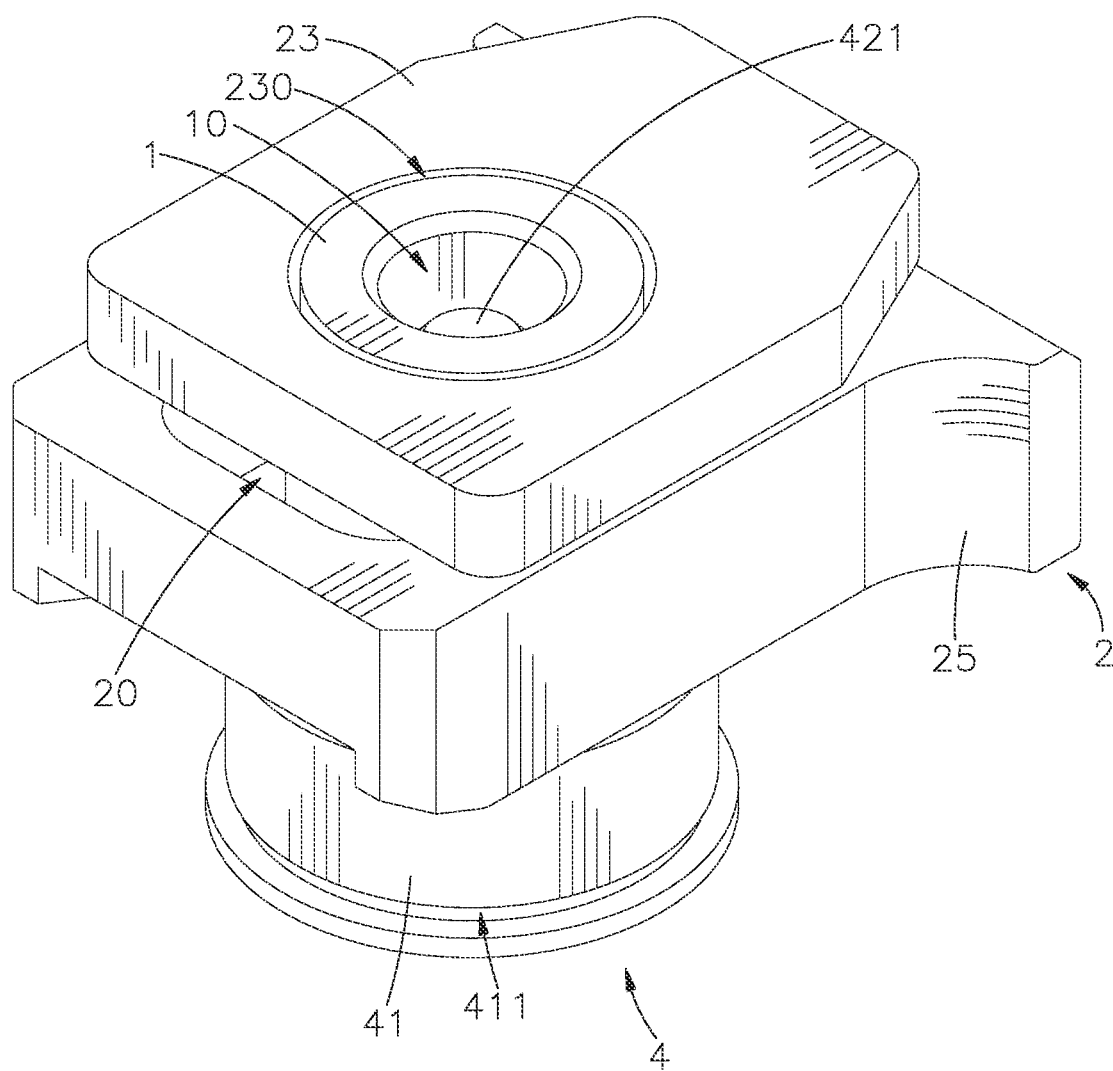
FIG. 1 is an oblique top elevational view of a push controlled positioning device in accordance with the present invention.
Figure 2:
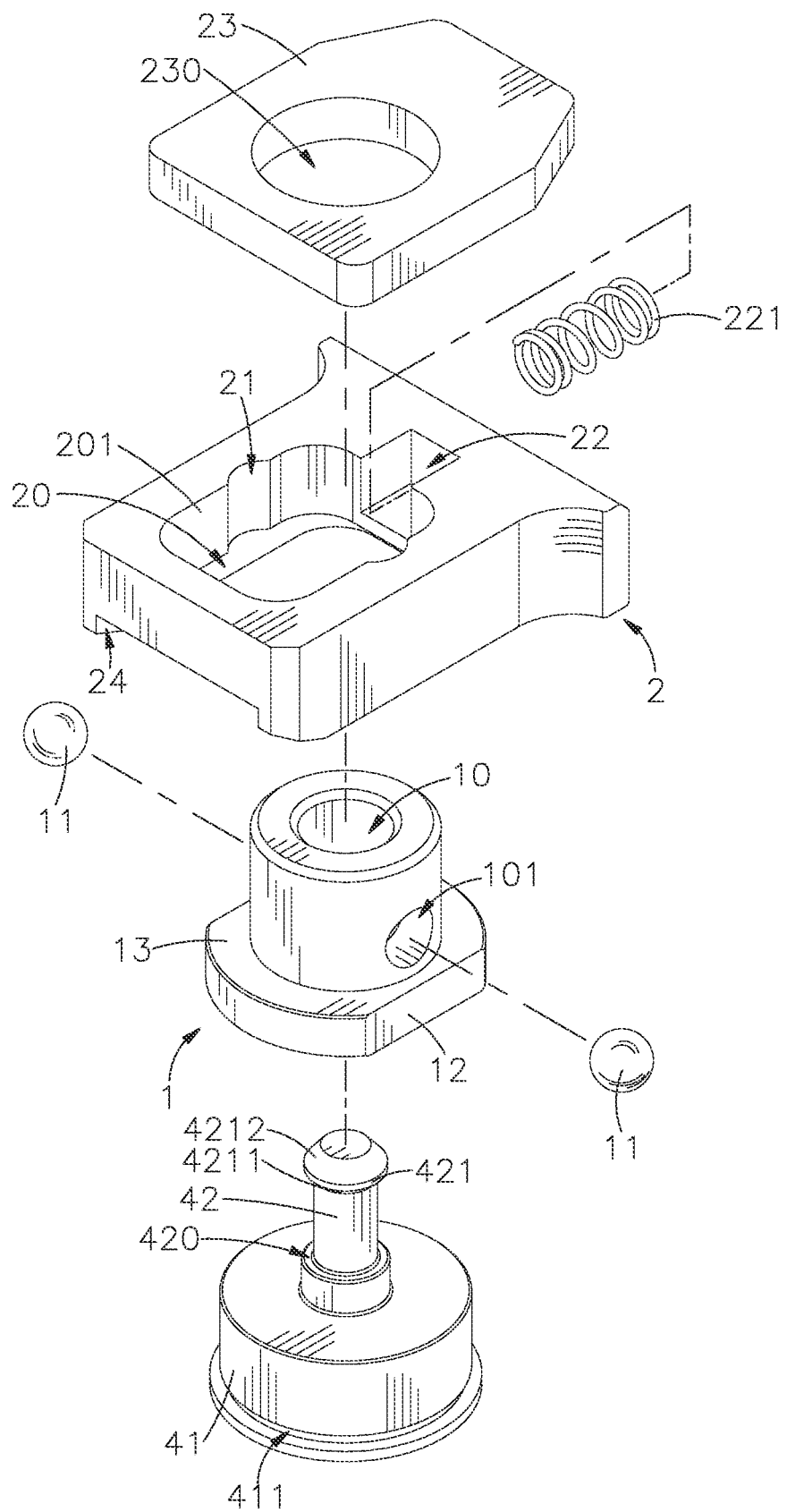
FIG. 2 is an exploded view of the push controlled positioning device in accordance with the present invention.
Figure 3:
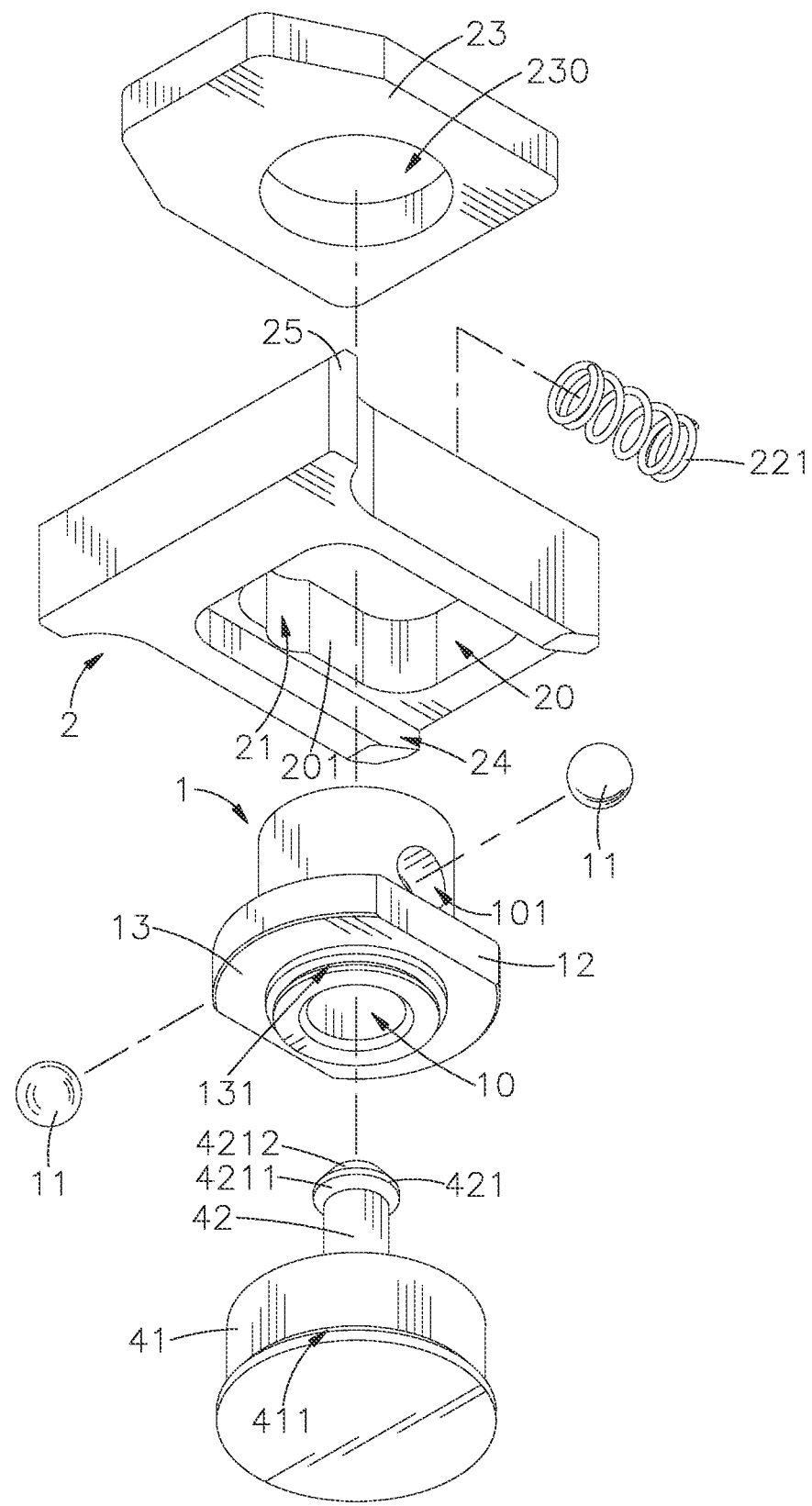
FIG. 3 corresponds to FIG. 2 when viewed from another angle.
Figure 4:
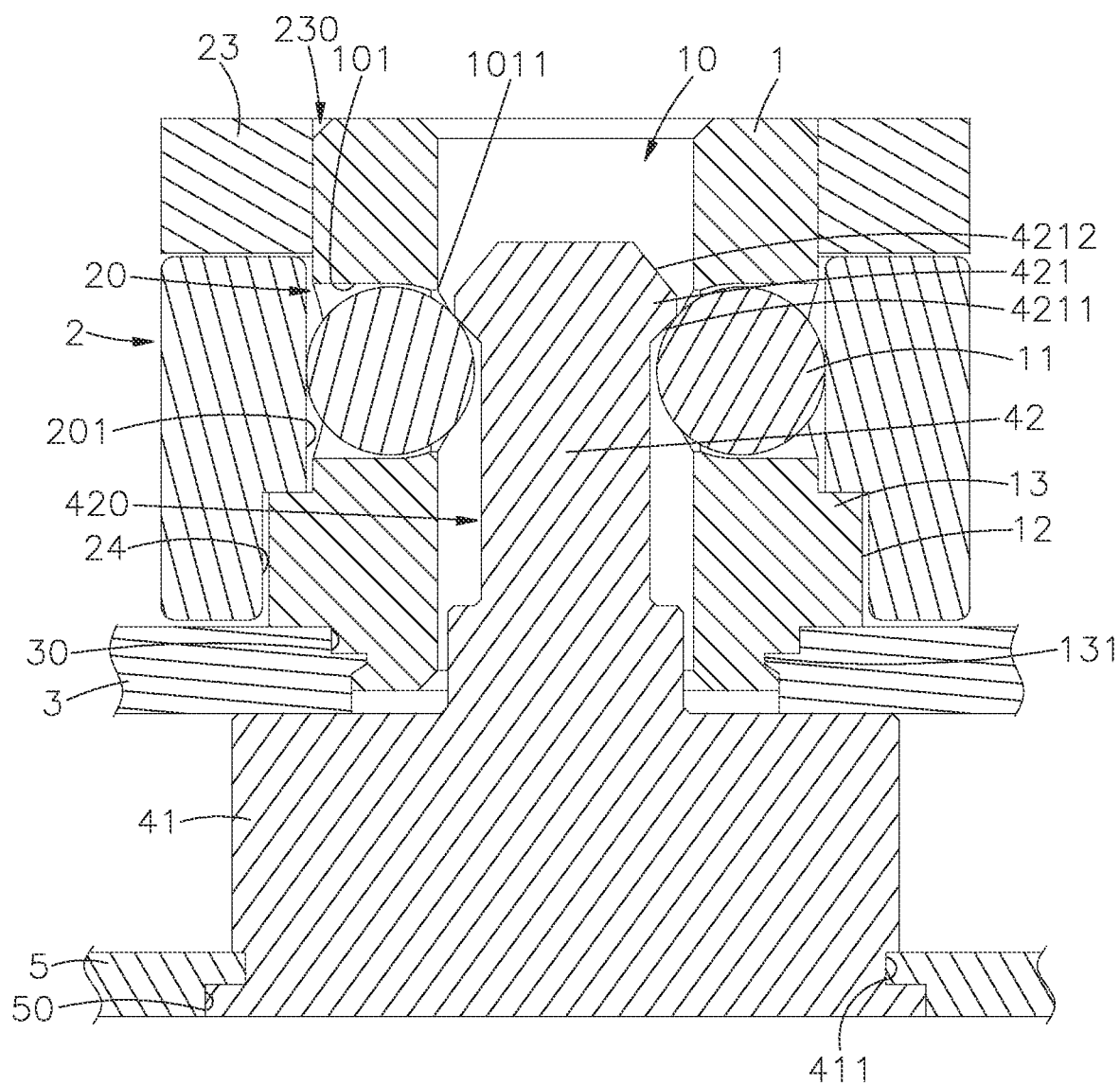
FIG. 4 is a sectional side view of the push controlled positioning device in accordance with the present invention.
Figure 5:
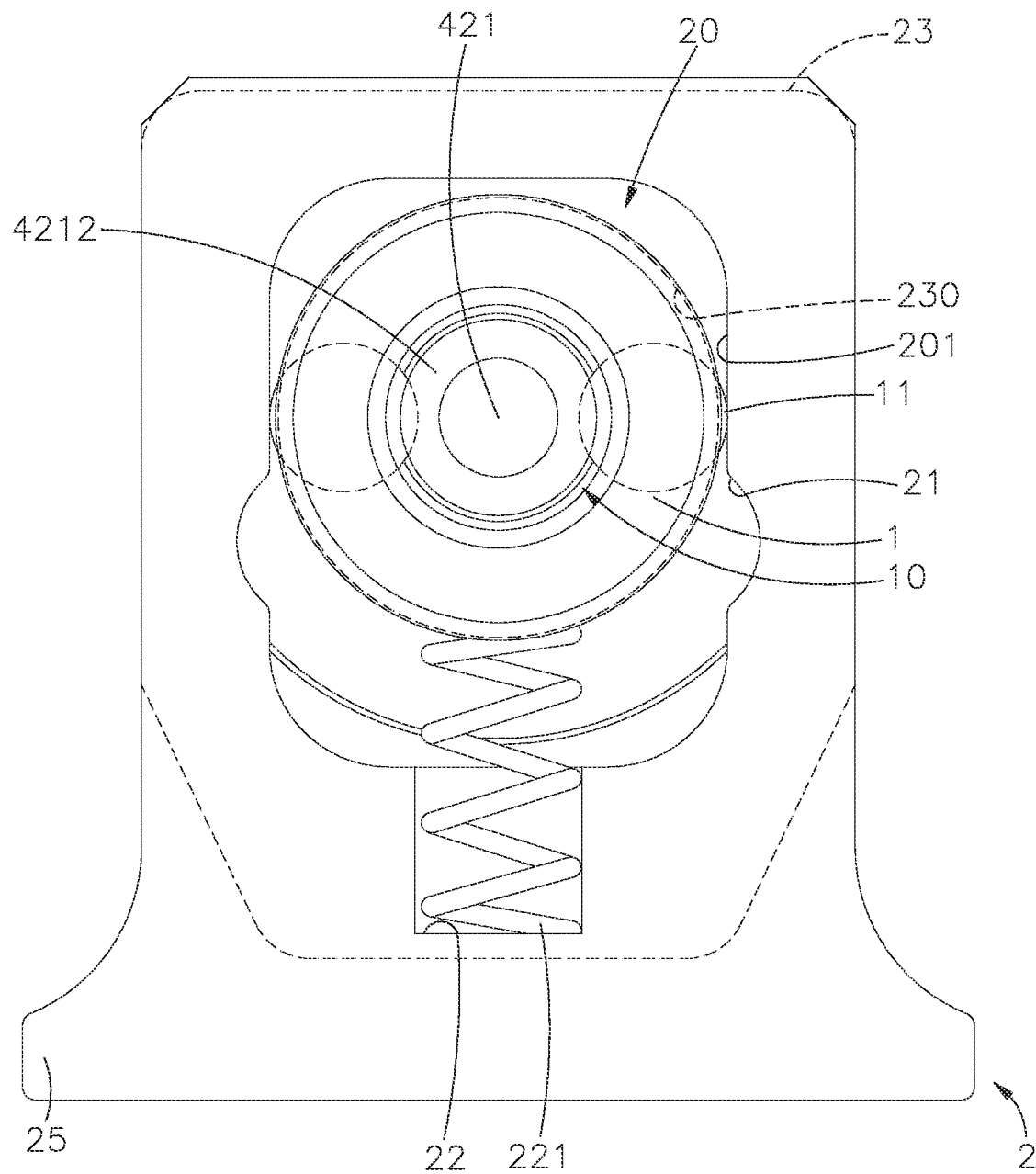
FIG. 5 is a top view before the push block of the present invention is pushed.
Figure 6:
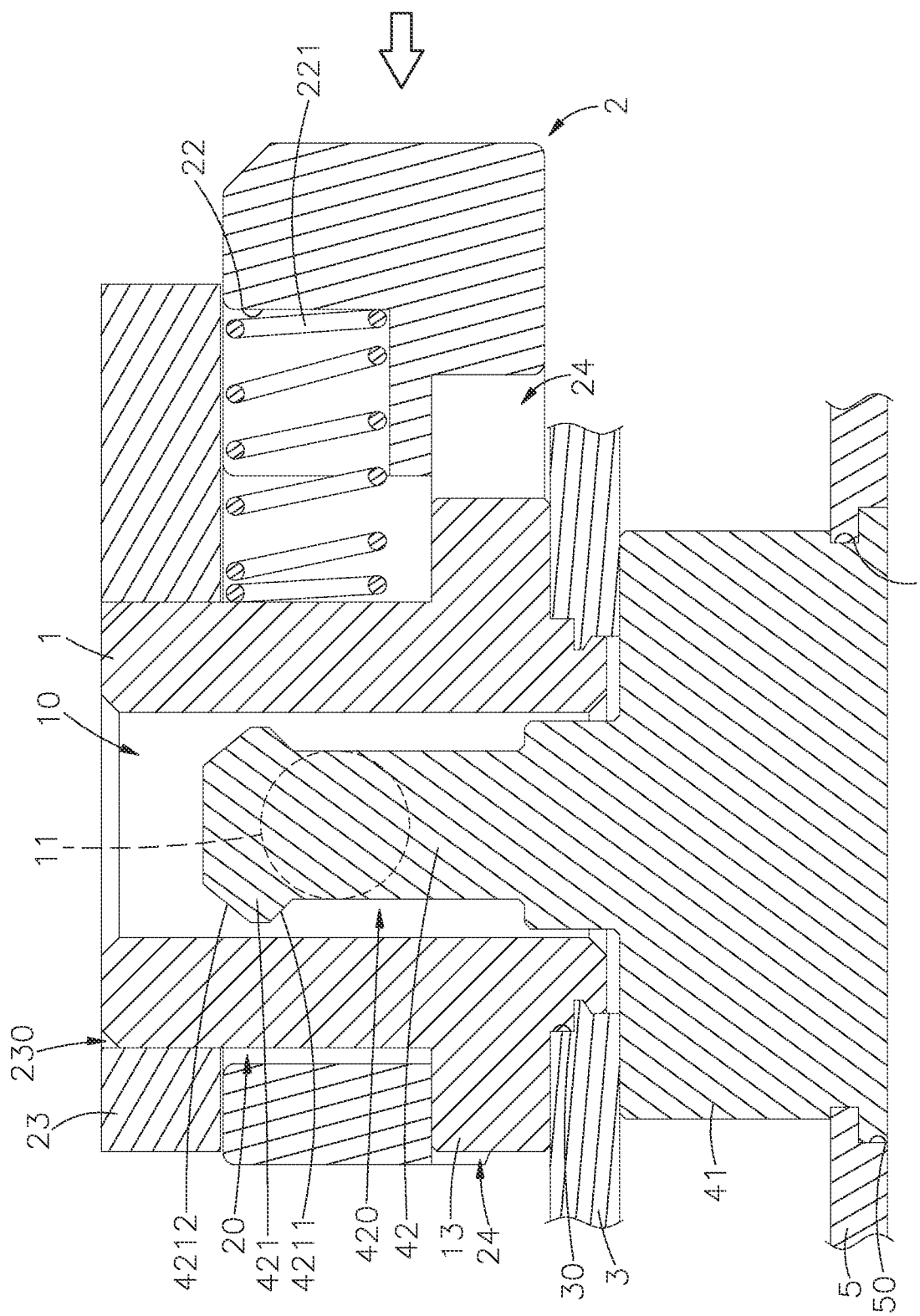
FIG. 6 is a sectional side view of the present invention in another direction.

Please refer to FIGS. 1-6, where FIG. 1 is an oblique top elevational view of a push controlled positioning device in accordance with the present invention, FIG. 2 is an exploded view of the push controlled positioning device in accordance with the present invention, FIG. 3 corresponds to FIG. 2 when viewed from another angle, FIG. 4 is a sectional side view the push controlled positioning device in accordance with the present invention, FIG. 5 is a top view before the push block of the present invention is pushed, and FIG. 6 is a sectional side view of the present invention in another direction. It can be clearly seen from the drawings that the push controlled positioning device of the present invention comprises a base 1 and a push block 2.

The base 1 comprises a through shaft hole 10 inside, two through holes 101 opposingly arranged on the inner wall surface of the shaft hole 10 and penetrating toward the outside in the direction perpendicular to the shaft hole 10, a blocking ring edge 1011 with an inwardly reduced hole diameter provided on the periphery of the hole edge of each through hole 101 adjacent to the shaft hole 10, a limiting ball 11 respectively installed inside each through hole 101 and stopped by the associating blocking ring edge 1011 that prevents the respective limiting ball 11 from falling into the shaft hole 10, and two opposing limiting portions 12 respectively provided on the periphery thereof near the through holes 101.

The push block 2 is movably assembled on the base 1, and the push block 2 and the base 1 are staggered and assembled vertically. The push block 2 comprises a sliding space 20, which can be placed on the base 1 for horizontal sliding displacement, two loosening grooves 21 respectively provided on two opposite side wall surfaces 201 of the sliding space 20 and movable with the push block 2 into alignment with the two through holes 101, an accommodating groove 22 provided on one side wall surface of the sliding space 20 in the vertical direction of the two loosening grooves 21, and an elastic member 221 accommodated in the accommodating groove 22 and stopped against the outer surface of the base 1. The push block 2 is then covered with a cover 23 to shield the outside of the sliding space 20, and the cover 23 is provided with a positioning shaft hole 230 for the base 1 to pass through.

The above-mentioned base 1 is provided with a bottom block 13 with a larger outer diameter on one side near the two through holes 101. The limiting portions 12 are planar limiting portions respectively located on the bottom block 13 at two opposite sides. The push block 2 is concavely provided with a guide chute 24 at the bottom of the sliding space 20, which can be nested at the two limiting portions 12, that is, the horizontal lateral sliding displacement of the push block 2 at the two limiting portions 12 can be limited. The base 1 is provided with a mounting groove 131 on the other side of the bottom block 13 opposite to the two through holes 101 for the positioning of a first positioning hole 30 of a preset first plate 3.

The above-mentioned push block 2 can be in the shape of a rectangle, and is provided with a rectangular sliding space 20 which is horizontally and laterally sleeved on the base 1. The rectangular push block 2 further comprises an actuating portion 25 bilaterally located on one side thereof near the accommodating groove 22. The cover 23 covering the push block 2 is also rectangular. The positioning shaft hole 230 of the cover 23 is used for the base 1 to be assembled and fixed after passing through, so that the push block 2 can slide horizontally and laterally outside the base 1 below the cover 23.

Figure 7:
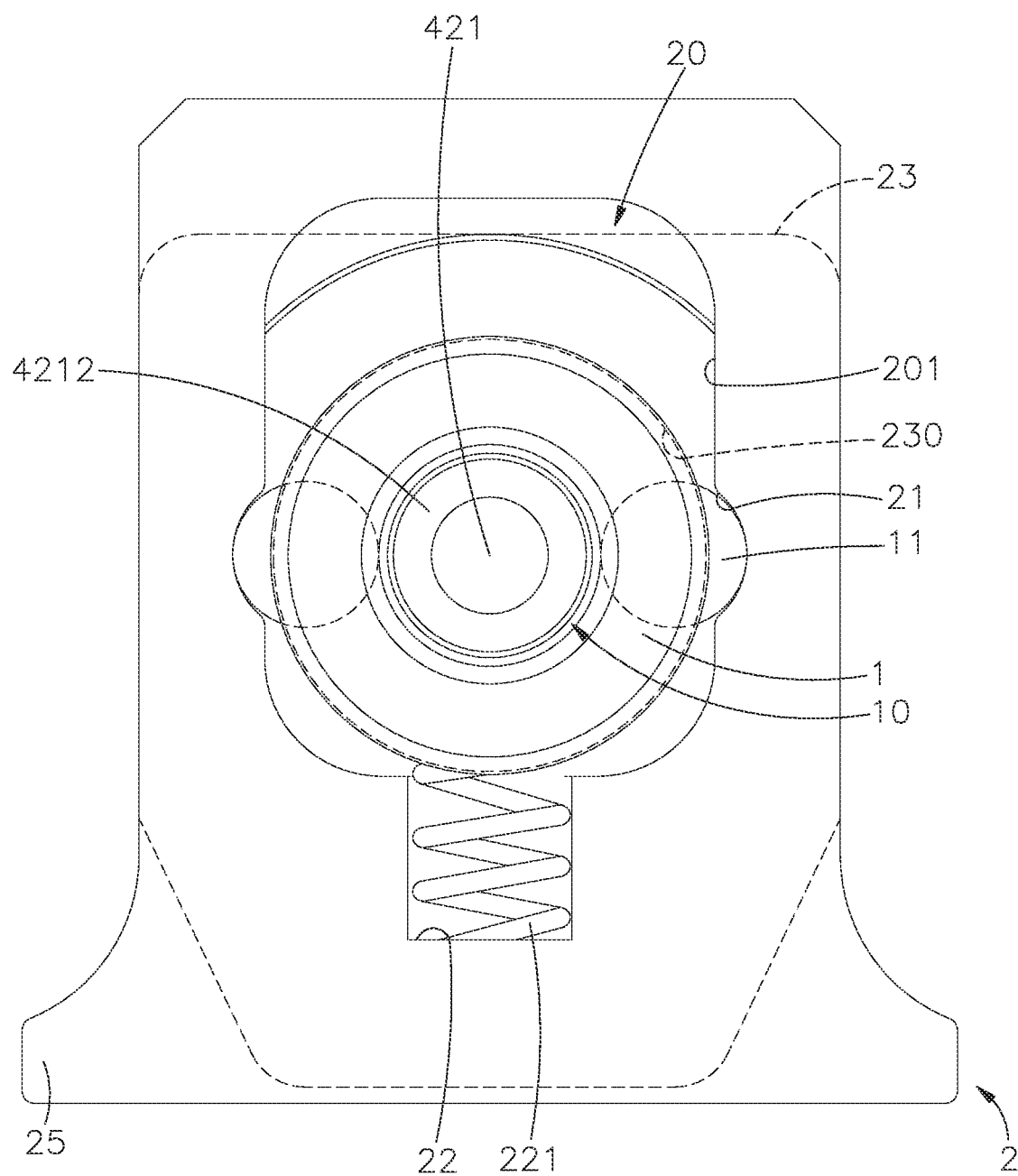
FIG. 7 is a top view after the push block of the present invention is pushed.
Figure 8:
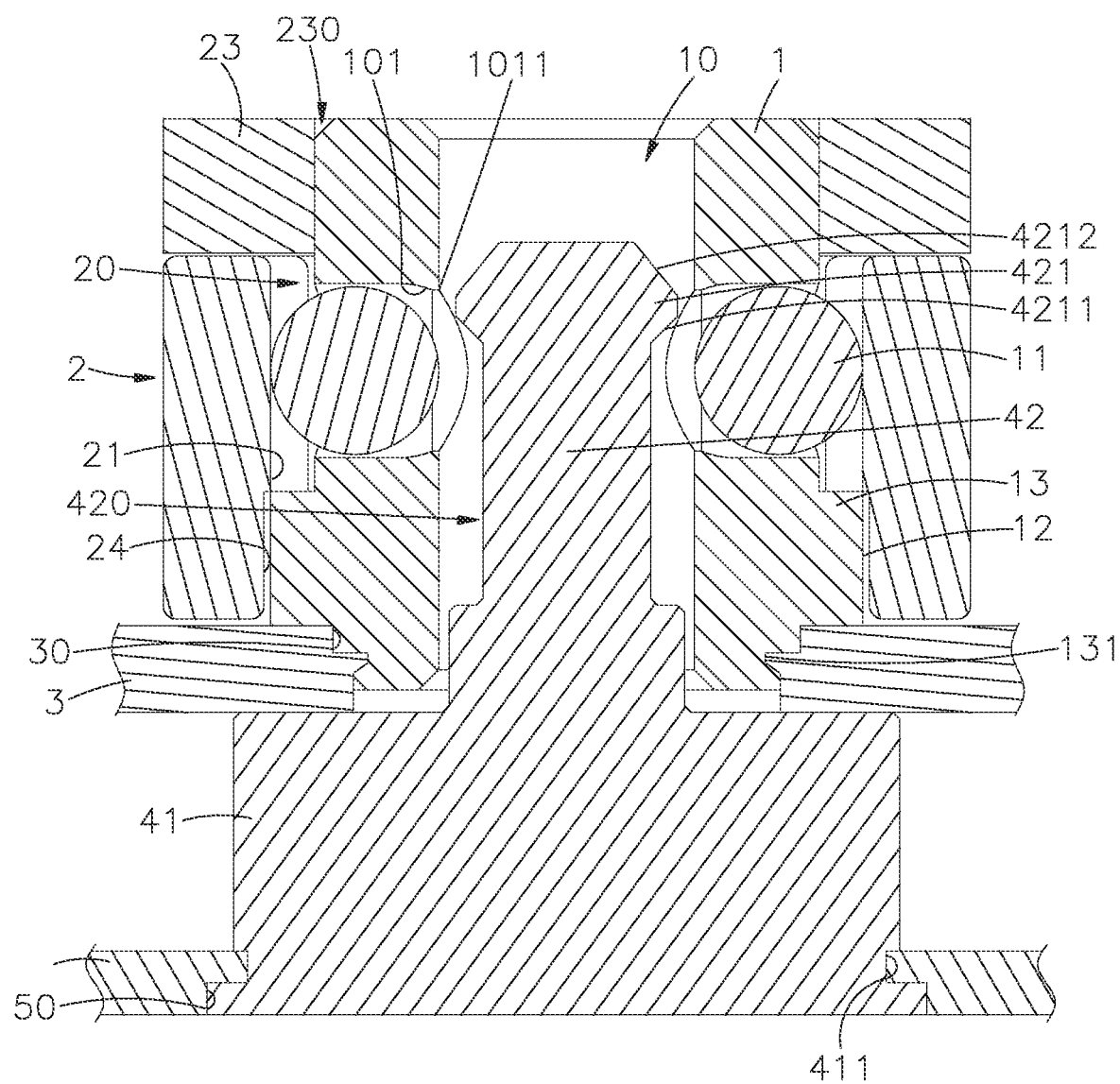
FIG. 8 is a sectional side view after the push block of the present invention is pushed.
Figure 9:
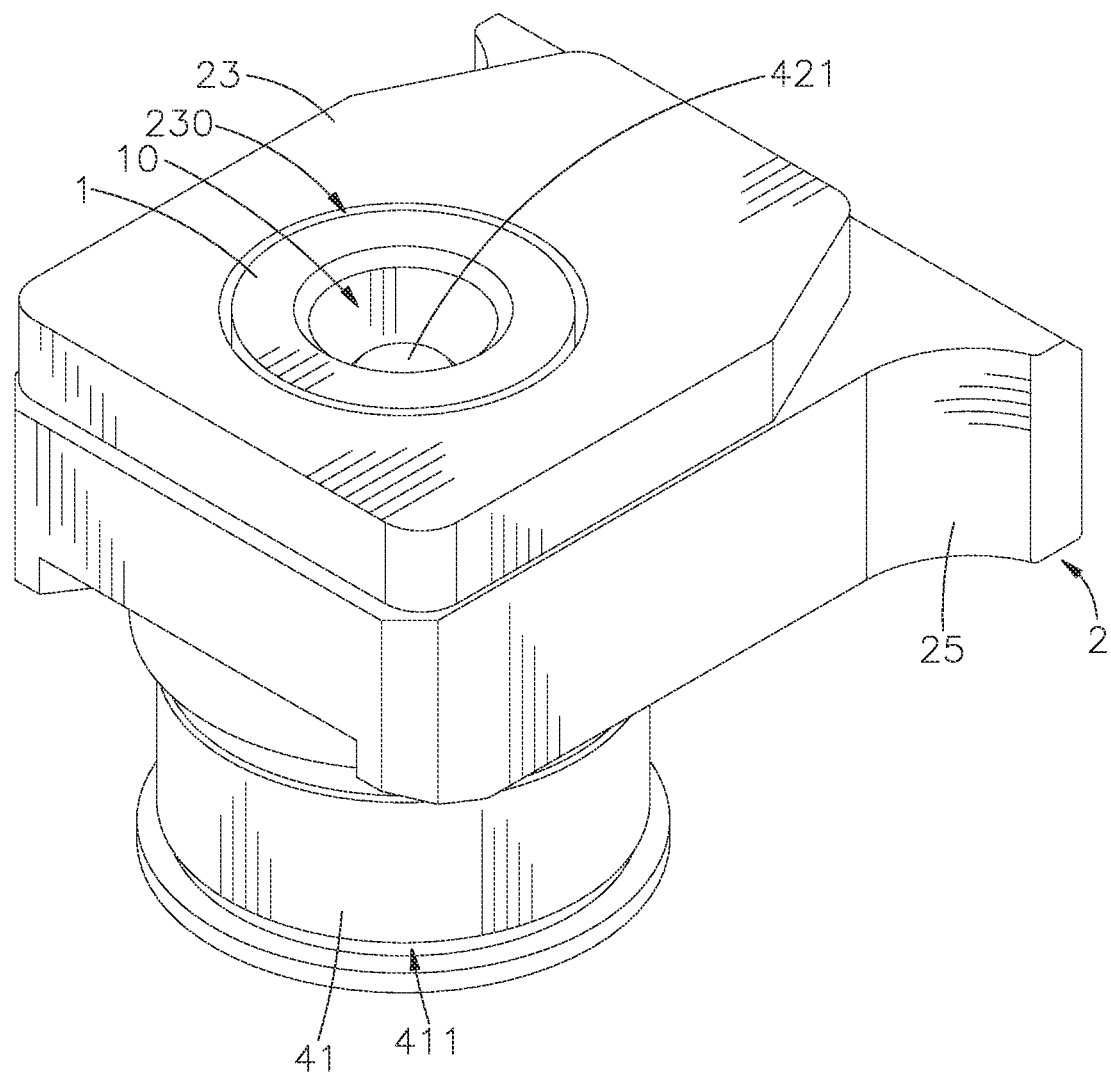
FIG. 9 is a an oblique top elevational view before the push block of the present invention is pushed.

Please refer to FIGS. 7, 8 and 9, where FIG. 7 is a top view after the push block of the present invention is pushed, FIG. 8 is a sectional side view after the push block of the present invention is pushed, and FIG. 9 is an oblique top elevational view before the push block of the present invention is pushed. It can be clearly seen from the drawings that the push controlled positioning device of the present invention comprises a base 1, a push block 2, and an axle seat 4 that is inserted into the shaft hole 10 of the base 1.

The base 1 comprises a through shaft hole 10 inside, two through holes 101 opposingly arranged on the inner wall surface of the shaft hole 10 and penetrating toward the outside in the direction perpendicular to the shaft hole 10, a blocking ring edge 1011 with an inwardly reduced hole diameter provided on the periphery of the hole edge of each through hole 101 adjacent to the shaft hole 10, a limiting ball 11 respectively installed inside each through hole 101 and stopped by the associating blocking ring edge 1011 that prevents the respective limiting ball 11 from falling into the shaft hole 10, and two opposing limiting portions 12 respectively provided on the periphery thereof near the through holes 101.

The push block 2 is movably assembled on the base 1, and the push block 2 and the base 1 are staggered and assembled vertically. The push block 2 comprises a sliding space 20, which can be placed on the base 1 for horizontal sliding displacement, two loosening grooves 21 respectively provided on two opposite side wall surfaces 201 of the sliding space 20 and respectively movably aimed at the two through holes 101, an accommodating groove 22 provided on one side wall surface of the sliding space 20 in the vertical direction of the two loosening grooves 21, and an elastic member 221 accommodated in the accommodating groove 22 and stopped against the outer surface of the base 1. The push block 2 is then covered with a cover 23 to shield the outside of the sliding space 20, and the cover 23 is provided with a positioning shaft hole 230 for the base 1 to pass through.

The axle seat 4 comprises a seat body 41 located outside the base 1, a shaft rod 42 extending outward from one side of the seat body 41 and penetrating into the shaft hole 10 of the base 1, a stop block 421 provided on the suspended side of the shaft rod 42, and a concave ring groove 420 provided at the shaft rod 42 between the stop block 421 and the seat body 41 in alignment with the through holes 101 so that the limiting ball 11 in each through hole 101 is able to be locked or withdrawn from the concave ring groove 420.

The outer diameter of the shaft rod 42 of the above-mentioned axle seat 4 is smaller than the shaft hole 10 of the base 1. A connecting side 411 is provided on the other side of the seat body 41 relative to the shaft rod 42, which is for a second positioning hole 50 of a preset second plate 5 to be inserted and fixed. The stop block 421 of the shaft rod 42 is provided with a first guide inclined surface 4211 that is tapered and inclined to extend to the concave ring groove 420, and a second guide inclined surface 4212 is provided on the stop block 421 and tapered and inclined to extend opposite to the first guide inclined surface 4211.

When the base 1, the push block 2 and the preset first plate 3 assembled at the mounting groove 131 of the base 1 are to be assembled on the axle seat 4 and the preset second plate 5, first place the base 1, the preset first plate 3, the push block 2 and the cover 23 on the top of the axle seat 4, and aim the shaft hole 10 of the base 1 at the shaft rod 42 of the axle seat 4, and then attach the base 1, the preset first plate 3, the push block 2 and the cover 23 onto the shaft rod 42 to let the limiting balls 11 in the respective through holes 101 of the base 1 be stopped against the second guide inclined surface 4212 of the stop block 421 of the shaft rod 42. The actuating portion 25 of the push block 2 is pushed with force, so that the sliding space 20 of the push block 2 slides along the outside of the base 1, while the guide chute 24 slides along the limiting portions 12 on both sides of the bottom block 13. At this time, the accommodating groove 22 squeezes the elastic member 221, so that the loosening grooves 21 of the two side wall surfaces 201 of the sliding space 20 are respectively located at the opposite through holes 101 on the two sides of the base 1, allowing the limiting balls 11 in the two through holes 101 to be respectively displaced outward to the respective loosing grooves 21. Then apply force to the preset first plate 3 to press the base 1, the preset first plate 3, the push block 2 and the cover 23 on the seat body 41 of the axle seat 4, so that the limiting balls 11 in the through holes 101 of the base 1 move over the stop block 421 and then enter the concave ring groove 420 of the shaft rod 42 along the first guide inclined surface 4211. Then, release the force on the actuating portion 25 of the push block 2, so that the elastic restoring force of the elastic member 221 pushes the accommodating groove 22 to the outside for sliding displacement. At this time, the two opposite side wall surfaces 201 of the sliding space 20 of the push block 2 slide to the outside of the two opposite through holes 101 of the base 1, and push the limiting balls 11 located in the two through holes 101 into the concave ring groove 420 of the shaft rod 42 to form a locking state, so that the base 1, the preset first plate 3, the push block 2 and the cover 23 are positioned on the seat body 41 and the shaft rod 42 of the axle seat 4, achieving the purpose of assembling the preset first plate 3, the base 1, and the push block 2 on one side of the axle seat 4 and the preset second plate 5. Just push the push block 2 horizontally on the base 1 to achieve the purpose of fixing or loosening the base 1 and the axle seat 4. By the moving position of the push block 2, it is easy to identify whether the positioning device is positioned or not, so as to achieve the effect of convenient application. Through the actuating portion 25 of the above-mentioned push block 2 movably assembled on the base 1, the push block 2 can be pushed to horizontally and laterally slide the sliding space 20 and the bottom guide chute 24 along the outside and the two limiting portions 12 of the base 1. The cover 23 holds down the push block 2 to form a limit, so that the push block 2 is prohibited from falling off and separating from the base 1, and the two loosening grooves 21 on the two side wall surfaces 201 of the sliding space 20 can be moved into alignment with the through holes 101 of the base 1. At the same time, the elastic member 221 compressed in the accommodating groove 22 of the push block 2 bounces and releases toward the outside of the base 1 through the elastic restoring force.

If you want to take out and separate the base 1, the push block 2 and the preset first plate 3 from the axle seat 4 and the preset second plate 5, the actuating portion 25 on one side of the push block 2 can be pushed by force, and the push block 2 and the sliding space 20 can be displaced horizontally and laterally along the outer portion of the base 1 and the guide chute 24 can be displaced horizontally and laterally along the limiting portions 12 on the two sides of the bottom block 13, so that the loosening grooves 21 on both sides of the sliding space 20 slide away from the two through holes 101, allowing removable of the preset first plate 3, the base 1 and the push block 2 from the shaft rod 42 of the axle seat 4. When the shaft hole 10 moves outward along the shaft rod 42, the limiting balls 11 in the through holes 101 on the two sides of the shaft hole 10 slide along the first guide inclined surface 4211 of the stop block 421 respectively and move to the outside of the through holes 101, then the two limiting balls 11 are respectively displaced toward the outside of the through holes 101 and clamped at the loosening grooves 21 on both sides of the sliding space 20. At this time, the preset first plate 3, the base 1 and the push block 2 can be taken out from the shaft rod 42 of the axle seat 4 and separated from the axle seat 4 and the preset second plate 5 smoothly. When the force applied to the actuating portion 25 of the push block 2 is released, the accommodating groove 22 is pushed to the outside by the elastic restoring force of the elastic member 221, so that the two side wall surfaces 201 of the sliding space 20 are moved into alignment with the through holes 101 of the base 1. In this way, it achieves the purpose of quickly taking out and separating the base 1, the preset first plate 3, the push block 2 and the cover 23 from the axle seat 4.

The above description is only a preferred embodiment of the present invention, and it does not limit the scope of the patent of the present invention. Therefore, any simple modifications and equivalent structural changes made by using the contents of the description and drawings of the present invention should be similarly included in the scope of the patent of the present invention.

To sum up, the above-mentioned push controlled positioning device of the present invention can indeed achieve its effect and purpose when it is used, so the present invention is a creation with excellent practicability. In order to meet the application requirements for an invention patent, an application should be filed in accordance with the law. It is hoped that the review committee will approve the case as soon as possible to protect the hard work of the inventor. If the review committee has any doubts, please do not hesitate to send a letter for instructions, the inventor will do his best to cooperate What the invention claimed is:

1. A push controlled positioning device, comprising:
   a base, said base comprising a through shaft hole inside, two through holes opposingly arranged on an inner wall surface of said shaft hole and penetrating toward an outside in the direction perpendicular to said shaft hole, a limiting ball respectively installed inside each said through hole, and two opposing limiting portions respectively provided on the periphery of said base near said through holes; and
   a push block movably mounted on said base in a perpendicular manner relative to each other, said push block comprising a sliding space placed on said base for horizontal sliding displacement, two loosening grooves respectively provided on two opposite side wall surfaces of said sliding space and movable with said push block into alignment with said two through holes, an accommodating groove provided on one side wall surface of said sliding space that is separated from the side wall surfaces that include the two loosening grooves, an elastic member accommodated in said accommodating groove and stopped against an outer surface of said base and a cover covered on a top side of said push block to shield an outside of said sliding space, said cover being provided with a positioning shaft hole for said base to pass through.

2. The push controlled positioning device as claimed in claim 1, wherein said base further comprises a bottom block with a larger outer diameter on one side near said two through holes; said limiting portions are planar limiting portions respectively located on said bottom block at two opposite sides; said push block further comprises a guide chute concavely provided at a bottom of said sliding space and nested at said two limiting portions.

3. The push controlled positioning device as claimed in claim 2, wherein said base further comprises a mounting groove located on a bottom side of said bottom block opposite to said two through holes for positioning of a first positioning hole of a preset first plate.

4. The push controlled positioning device as claimed in claim 1, wherein said push block and said sliding space are rectangular, said sliding space can be placed on said base for horizontal sliding displacement, and said push block further comprises an actuation portion bilaterally located on one side thereof near said accommodating groove.

5. The push controlled positioning device as claimed in claim 1, wherein said cover covered on said push block is in the shape of a rectangle, and said positioning shaft hole of said cover is used for said base to be combined and fixed after being worn, so that said push block is allowed to be pushed to slide horizontally and laterally relative to said base under said cover.

6. A push controlled positioning device, comprising:
   a base, said base comprising a through shaft hole inside, two through holes opposingly arranged on an inner wall surface of said shaft hole and penetrating toward an outside in the direction perpendicular to said shaft hole, a limiting ball respectively installed inside each said through hole, and two opposing limiting portions respectively provided on the periphery of said base near said through holes;
   a push block movably mounted on said base in a perpendicular manner relative to each other, said push block comprising a sliding space placed on said base for horizontal sliding displacement, two loosening grooves respectively provided on two opposite side wall surfaces of said sliding space and movable with said push block into alignment with said two through holes, an accommodating groove provided on one side wall surface of said sliding space that is separated from the side wall surfaces that include the two loosening grooves, an elastic member accommodated in said accommodating groove and stopped against an outer surface of said base and a cover covered on a top side of said push block to shield an outside of said sliding space, said cover being provided with a positioning shaft hole for said base to pass through; and an axle seat, said axle seat comprising a seat body located outside said base, a shaft rod extending outward from one side of said seat body and penetrating into said shaft hole of said base, a stop block provided on a suspended side of said shaft rod, and a concave ring groove provided at said shaft rod between said stop block and said seat body in alignment with said two through holes so that said limiting ball in each said through hole is able to be locked or withdrawn from said concave ring groove.

7. The push controlled positioning device as claimed in claim 6, wherein an outer diameter of said shaft rod is smaller than the diameter of said shaft hole; said axle seat further comprises a connecting side provided on the other side of said seat body relative to said shaft rod for a second positioning hole of a preset second plate to be inserted and fixed.

8. The push controlled positioning device as claimed in claim 6, wherein said stop block of said axle seat comprises a first guide inclined surface that is tapered and inclined to extend to said concave ring groove, and a second guide inclined surface that is tapered and inclined to extend opposite to said first guide inclined surface.

\* \* \* \* \*